US011559964B2

(12) United States Patent
Benson

(10) Patent No.: US 11,559,964 B2
(45) Date of Patent: Jan. 24, 2023

(54) COMPOSITE STRUCTURES, COMPOSITE STORAGE TANKS, VEHICLES INCLUDING SUCH COMPOSITE STORAGE TANKS, AND RELATED SYSTEMS AND METHODS

(71) Applicant: Northrop Grumman Systems Corporation, Falls Church, VA (US)

(72) Inventor: Vernon M. Benson, Morgan, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 144 days.

(21) Appl. No.: 16/894,323

(22) Filed: Jun. 5, 2020

(65) Prior Publication Data

US 2020/0384719 A1 Dec. 10, 2020

Related U.S. Application Data

(60) Provisional application No. 62/858,213, filed on Jun. 6, 2019.

(51) Int. Cl.
*B32B 1/08* (2006.01)
*B32B 3/00* (2006.01)
(Continued)

(52) U.S. Cl.
CPC .................. *B32B 1/08* (2013.01); *B32B 3/00* (2013.01); *B32B 5/24* (2013.01); *B32B 7/12* (2013.01);
(Continued)

(58) Field of Classification Search
CPC .... B32B 1/08; B32B 3/00; B32B 5/24; B32B 5/22; B32B 7/12; B32B 7/04; F17C 1/06; F17C 1/04; F17C 1/02
(Continued)

(56) References Cited

U.S. PATENT DOCUMENTS 3,266,660 A * 8/1966 Ragettli ................. B65D 13/00
220/62.19
3,339,783 A * 9/1967 Gorman .................... F17C 3/06
220/560.11
(Continued)

FOREIGN PATENT DOCUMENTS

AU 544679 B2 6/1985
DE 10105819 A1 8/2002
(Continued)

OTHER PUBLICATIONS

Drescher et al., "Metallic Permeation Barrier for Cryogenic Composite Propellant Storage and Transfer Applications," Conference Paper, (Mar. 2012), 6 pages.
(Continued)

*Primary Examiner* — Robert J Hicks
(74) *Attorney, Agent, or Firm* — TraskBritt

(57) ABSTRACT

A composite storage tank may include a wall structure including at least three regions including an inner region, an outer region, and at least one permeation barrier. Another region may be optionally incorporated for venting potential permeation of fluids. The at least one permeation barrier and/or the venting layer may be strategically positioned between the inner region and the outer region to reduce or at least partially prevent fluid permeation of the inner region or the outer region. A vehicle may include such a composite storage tank. Methods of forming a composite fluid storage tank may include forming an inner composite region, applying a permeation barrier to an outer surface of the inner composite region, forming an outer composite region, and curing the inner composite region and the outer composite region with the permeation barrier to form the composite fluid storage tank.

25 Claims, 9 Drawing Sheets

(51) Int. Cl.
*B32B 15/08* (2006.01)
*B32B 5/24* (2006.01)
*F17C 1/00* (2006.01)
*B32B 7/12* (2006.01)
*B64D 37/06* (2006.01)

(52) U.S. Cl.
CPC ............... *B32B 15/08* (2013.01); *F17C 1/00*
(2013.01); *B32B 2250/40* (2013.01); *B32B 2255/02* (2013.01); *B32B 2255/205* (2013.01); *B32B 2307/724* (2013.01); *B32B 2307/7242* (2013.01); *B32B 2439/40* (2013.01); *B32B 2605/18* (2013.01); *B64D 37/06* (2013.01); *F17C 2201/0109* (2013.01); *F17C 2201/0166* (2013.01); *F17C 2203/0607* (2013.01); *F17C 2203/0624* (2013.01); *F17C 2203/0636* (2013.01); *F17C 2203/0658* (2013.01); *F17C 2209/227* (2013.01); *F17C 2209/232* (2013.01); *F17C 2221/011* (2013.01); *F17C 2221/012* (2013.01); *F17C 2270/0186* (2013.01)

(58) Field of Classification Search
USPC ...... 220/560.11, 560.04, 560.08, 62.19, 589, 220/588, 586
See application file for complete search history.

(56) References Cited

U.S. PATENT DOCUMENTS

| | | | |
|---|---|---|---|
| 3,400,849 A * | 9/1968 | Pottier | F17C 3/04 220/560.08 |
| 3,760,971 A * | 9/1973 | Sterrett | F17C 13/001 220/560.11 |
| 3,993,213 A | 11/1976 | Burge et al. | |
| 4,773,952 A * | 9/1988 | Wesley, Jr. | B29C 53/602 220/62.19 |
| 5,153,038 A * | 10/1992 | Koyama | B32B 27/08 428/35.8 |
| 5,231,811 A * | 8/1993 | Andrepont | B32B 13/04 52/249 |
| 5,419,139 A | 5/1995 | Blum et al. | |
| 5,589,241 A | 12/1996 | Stiles et al. | |
| 5,720,173 A | 2/1998 | Bonmann et al. | |
| 5,850,054 A | 12/1998 | Bonmann et al. | |
| 5,914,154 A | 6/1999 | Nemser | |
| 6,708,502 B1 * | 3/2004 | Aceves | F17C 3/08 220/560.08 |
| 6,868,981 B2 | 3/2005 | Rosen et al. | |
| 7,024,868 B2 * | 4/2006 | Pye | F17C 1/12 220/560.04 |
| 7,036,323 B2 | 5/2006 | Schnagl | |
| 7,086,236 B2 | 8/2006 | Fischer et al. | |
| 7,803,241 B2 | 9/2010 | Cundiff et al. | |
| 7,955,675 B2 | 6/2011 | Maeda et al. | |
| 8,039,072 B2 | 10/2011 | Takahashi et al. | |
| 8,709,330 B2 | 4/2014 | Huskamp et al. | |
| 9,017,524 B2 | 4/2015 | Tsukamoto | |
| 9,205,373 B2 | 12/2015 | Leavitt | |
| 9,266,279 B2 | 2/2016 | Benson et al. | |
| 9,302,437 B2 | 4/2016 | Radtke | |
| 9,375,652 B2 | 6/2016 | Willett | |
| 10,011,089 B2 | 7/2018 | Lyons et al. | |
| 2002/0155232 A1 | 10/2002 | Delay | |
| 2003/0190506 A1 | 10/2003 | Mueller | |
| 2003/0198768 A1 * | 10/2003 | Delbarre | C08L 23/0815 428/36.6 |
| 2006/0013973 A1 | 1/2006 | Flaconneche et al. | |
| 2006/0218940 A1 | 10/2006 | Starkovich | |
| 2009/0314785 A1 | 12/2009 | Cronin et al. | |
| 2011/0168722 A1 | 7/2011 | Baudat et al. | |
| 2012/0048865 A1 | 3/2012 | Eihusen et al. | |
| 2014/0174083 A1 | 6/2014 | Gerstler et al. | |
| 2015/0143806 A1 | 5/2015 | Friesth | |
| 2016/0023381 A1 | 1/2016 | Mazabraud et al. | |
| 2016/0348838 A1 | 12/2016 | Griffith et al. | |
| 2017/0002800 A1 | 1/2017 | Bean et al. | |
| 2018/0055042 A1 | 3/2018 | Sarmentero Ortiz | |
| 2018/0099477 A1 | 4/2018 | Blair et al. | |
| 2018/0100047 A1 | 4/2018 | Iftime et al. | |

FOREIGN PATENT DOCUMENTS

| | | | |
|---|---|---|---|
| DE | 10232521 A1 | 4/2004 | |
| DE | 10232522 A1 | 4/2004 | |
| DE | 102004035319 A1 | 2/2006 | |
| DE | 102005035647 A1 | 2/2007 | |
| DE | 102005050061 A1 | 4/2007 | |
| DE | 102007057978 A1 | 6/2009 | |
| DE | 19645488 C5 | 8/2012 | |
| DE | 102014204406 A1 | 9/2015 | |
| EP | 1108590 A2 * | 6/2001 | ............. B32B 27/08 |
| EP | 1408274 A2 | 4/2004 | |
| EP | 1718545 B1 | 1/2009 | |
| EP | 2565513 A1 | 3/2013 | |
| FR | 2161484 A5 | 7/1973 | |
| GB | 2135901 A * | 9/1984 | ............. B01J 3/048 |
| JP | 60-173358 A | 9/1985 | |
| JP | 05-215298 A | 8/1993 | |
| JP | 2016-502054 A | 1/2016 | |
| NO | 306035 B1 | 9/1999 | |
| NO | 310329 B1 | 6/2001 | |
| WO | 2005/085092 A2 | 9/2005 | |
| WO | WO-2016189664 A1 * | 12/2016 | ............... F17C 1/06 |

OTHER PUBLICATIONS

Mallick et al., "Ultralight Linerless Composite Tanks for In-Space Applications," American Institute of Aeronautics and Astronautics, (2004), 13 pages.

\* cited by examiner

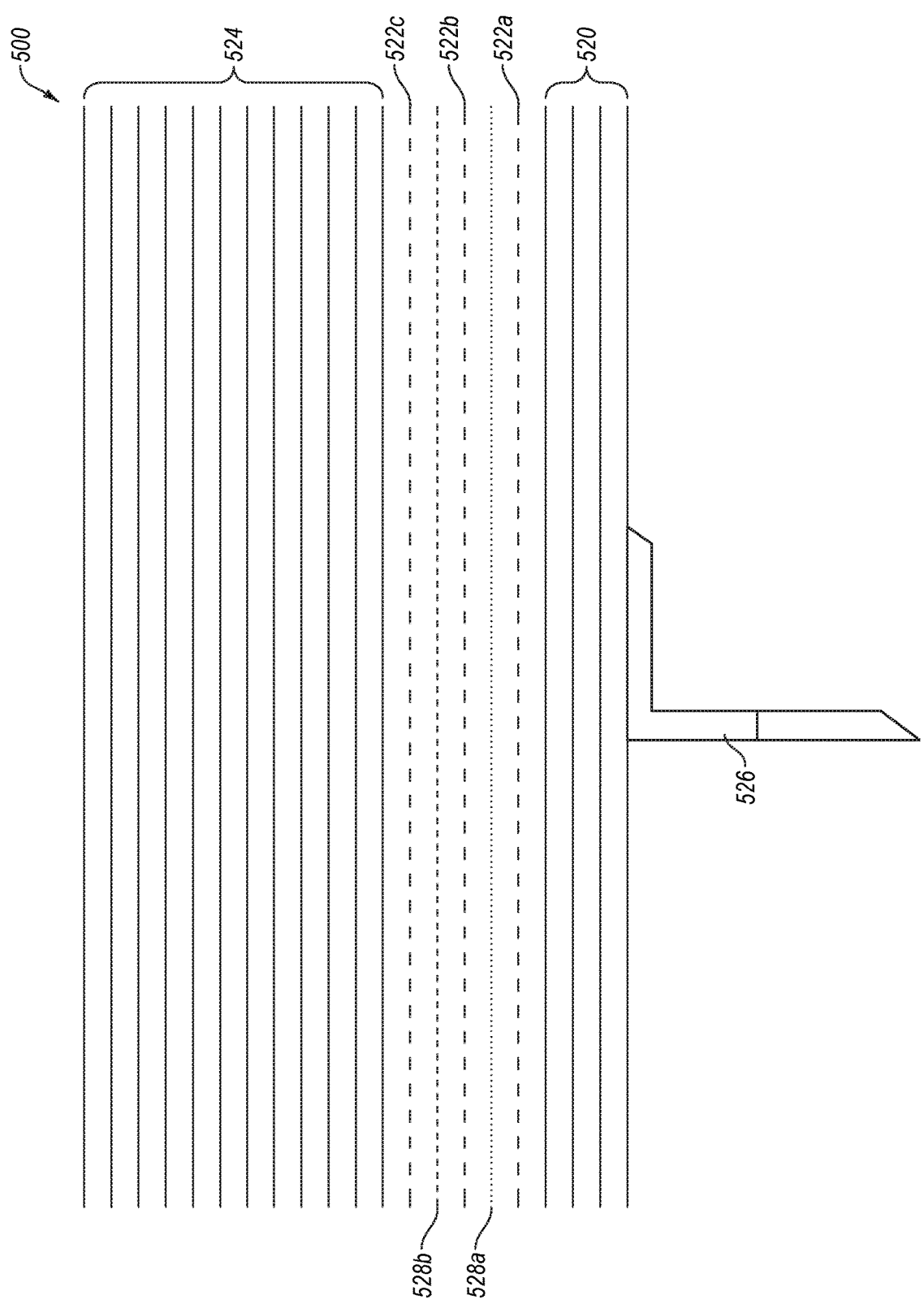

COMPOSITE STRUCTURES, COMPOSITE STORAGE TANKS, VEHICLES INCLUDING SUCH COMPOSITE STORAGE TANKS, AND RELATED SYSTEMS AND METHODS

CROSS-REFERENCE TO RELATED APPLICATION

This application claims the benefit under 35 U.S.C. § 119(e) of U.S. Provisional Patent Application Ser. No. 62/858,213, filed Jun. 6, 2019, the disclosure of which is hereby incorporated herein in its entirety by this reference.

TECHNICAL FIELD

Embodiments of the present disclosure relate to composite structures, composite storage tanks and related devices, apparatuses, systems, and methods. Embodiments of the present disclosure may specifically relate to composite cryogenic storage tanks.

BACKGROUND

Fiber-reinforced composite materials provide relatively lightweight and high strength structures that are implemented in a variety of industries, including automotive, military, and aerospace applications. Composite materials may be used to form containers (e.g., tanks, storage containers, etc.). The containers may be used to transport liquid or gaseous materials such as hydrogen, oxygen, nitrogen, natural gas, etc. Some small molecule gasses, such as hydrogen, may permeate the composite materials and escape the containers. The volatile nature of many fuels such as hydrogen and oxygen may result in dangerous situations if the fuel escapes the containers and collect in significant quantities. For example, if ignited, the fuels could cause damage to the structure or vehicle to which the container is attached or to the occupants of such. In aerospace applications, damage to the vehicle may result in the occupants or equipment being transported being destroyed or becoming stranded and requiring a second vehicle to be sent to retrieve or rescue the equipment and/or occupants.

Some composite containers utilize a liner that may reduce the occurrence of small molecule gases escaping from the containers. The liners define an innermost layer of the container over which the composite layers are formed. However, typical liners are generally metal liners of sufficient thickness to be formed and welded. These liners are expensive to build and add undesirable weight to the tanks. Other thin liners have been used at the inner surface of the tank but tend to be susceptible to disbond due to coefficient of thermal expansion (CTE) mismatches or damage due to tooling extraction, tank access, etc. As such these liners may still not provide a reliable containment of the gases in the containers, especially where the gases are stored over relatively long periods of time. Furthermore, the liner at the inner surface may complicate production and/or functionality of the container, as it may be difficult to support any internal structure within the container, such as inner slosh baffles, stiffeners, or port hardware; without compromising the integrity of the liner.

SUMMARY OF DISCLOSURE

Some embodiments of the present disclosure include a composite storage tank having a wall structure including at least three regions. The three regions may include an inner region, an outer region, and at least one permeation barrier. The inner region may be a first composite material. The outer region may be a second composite material. The at least one permeation barrier may be positioned strategically between the inner region and the outer region and be supported by at least one of the inner region and the outer region. The at least one permeation barrier may be formulated and configured to substantially inhibit permeation of a fluid contained in the composite storage tank.

Another embodiment of the present disclosure may include a vehicle. The vehicle may include a framework or shell structure, and a composite storage tank configured to store one or more fluids. The composite storage tank may include a wall structure having an inner region, an outer region, at least one permeation barrier, and a stem. The inner region may be a first composite material. The outer region may be a second composite material configured to secure the composite storage tank to the framework or act as part of the framework or shell of the vehicle. The at least one permeation barrier may be positioned between the inner region and the outer region and supported by at least one of the inner region and the outer region. The stem may be integrally formed with one or more of the inner region, the outer region, and the at least one permeation barrier. The stem may extend to a port (e.g., a valve or piping connection) and provide a fluid pathway for fuel into or out of the composite storage tank.

Another embodiment of the present disclosure may include a method of forming a composite storage tank. The method may include forming an inner composite region by applying at least one ply of a first material on a forming surface of a tool configured to form the composite storage tank. At least one permeation barrier may be applied to an outer surface of the inner composite region. An outer composite region may be formed by applying at least one ply of a second material on an outer surface of the at least one permeation barrier. The inner composite region, the at least one permeation barrier, and the outer composite region may be co-cured or co-bonded to form the composite storage tank.

Another embodiment of the present disclosure may include a method of forming a composite storage tank. The method may include forming an inner composite region by applying at least one ply of a first material on a forming surface of a tool configured to form the storage tank. At least one permeation barrier may be applied to an outer surface of the inner composite region followed by a venting region for evacuating any leakage through the inner surface and the barrier layers for a safer, more redundant system. An outer composite region may be formed by applying at least one ply of a second material on an outer surface of the venting region. The inner composite region, the at least one permeation barrier, the venting layer(s), and the outer composite region may be separately cured, co-cured, or co-bonded to form the composite storage tank.

BRIEF DESCRIPTION OF THE DRAWINGS

The present disclosure may be understood more fully by reference to the following detailed description of example embodiments, which are illustrated in the appended figures.

FIG. 5 is an enlarged side schematic of a side wall portion of a composite tank according to an embodiment of the present disclosure;

DETAILED DESCRIPTION

Figure 1:
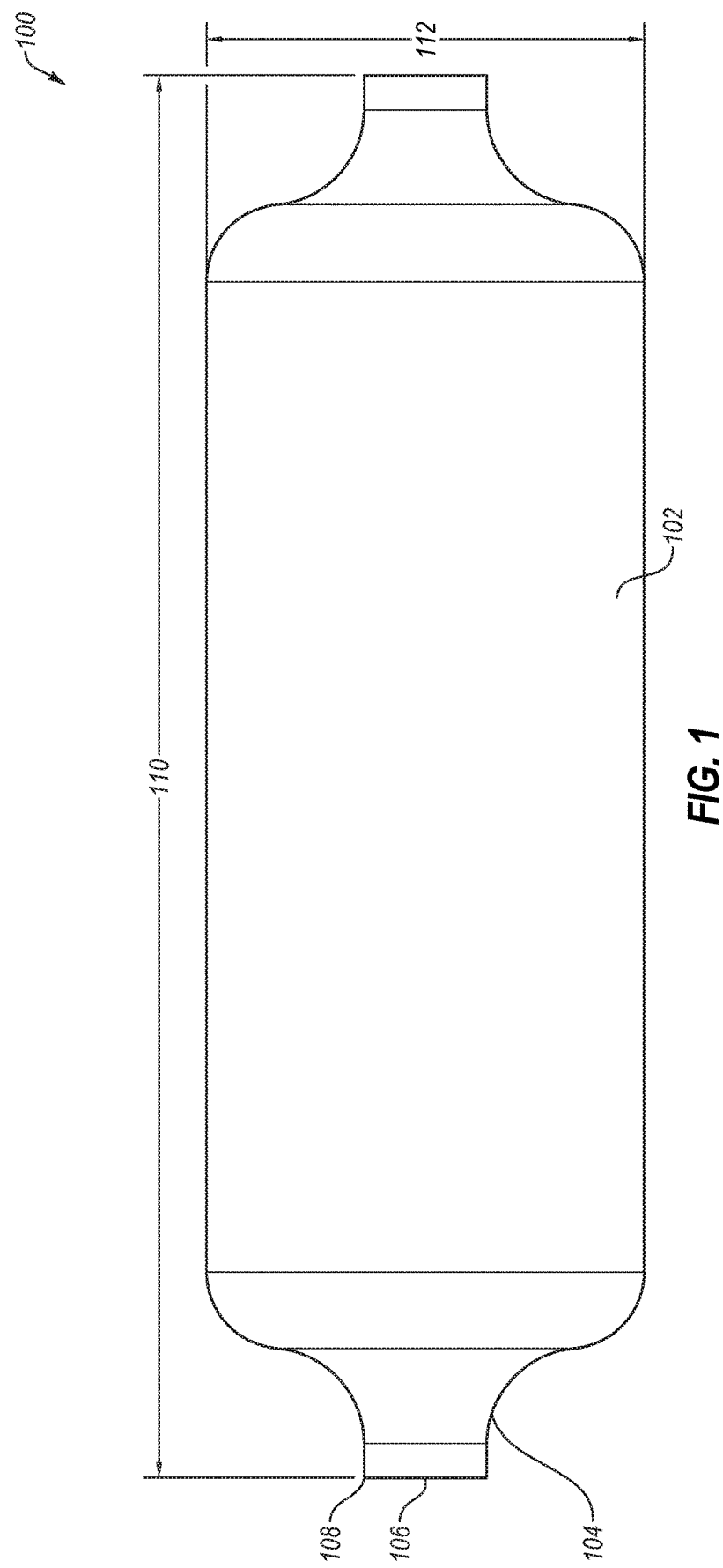
FIG. 1 is a side view of a composite storage tank according to an embodiment of the present disclosure.

In some instances, the illustrations presented herein are not meant to be actual views of any particular device, apparatus, system, assembly, method, or component thereof, but are merely simplified schematic representations employed to describe illustrative embodiments of the disclosure. The drawings are not necessarily to scale.

As used herein, any relational term, such as "first," "second," "over," "beneath," "top," "bottom," "underlying," "up," "down," etc., is used for clarity and convenience in understanding the disclosure and accompanying drawings, and does not connote or depend on any specific preference, orientation, or order, except where the context clearly indicates otherwise. In some instances, these terms may refer to an orientation of elements as illustrated in the figures.

As used herein, the terms "vertical" and "horizontal" may refer to a drawing figure as oriented on the drawing sheet, and are in no way limiting of orientation of a feature, or any portion thereof, unless it is apparent that a particular orientation of the feature is necessary or desirable for operation in view of gravitational forces.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein.

As used herein, the term "cryogenic temperature" may mean and include temperatures below −100° C. (−148° F.), such as between about −100° C. (−148° F.) and absolute zero (e.g., −273° C. (−460° F.)). In some embodiments, cryogenic temperature may mean below about −150° C. (−238° F.), or below about −170° C. (−274° F.). In additional embodiments, cryogenic temperature may mean below about −148° C. (−298° F.), or below about −253° C. (−423° F.).

As used herein, the term "and/or" means and includes any and all combinations of one or more of the associated listed items.

Embodiments of the present disclosure may provide linerless composite storage tanks (e.g., tanks lacking an innermost liner, such as a welded metal liner or polymer liner), structures and related devices, apparatuses, systems, and methods. The linerless composite storage tanks may include multiple layers of materials formulated and configured to provide structure, and permeation resistance.

Materials used to form a composite structure are generally described as plies of material or ply layers, which may be laid up on or over a tool and/or another layer of material one at a time and/or multiple layers at the same time. The plies or layers can be made of any materials with reinforcing fibers (or plies) that exhibit desired characteristics, including but not limited to, pre-preg material and/or dry fiber material. The pre-preg material and the dry fiber material can include, but are not limited to, unidirectional tapes, bias tapes, woven fabrics, non-woven fabrics, and non-crimp fabrics. The orientation of the fibers (or plies) may also vary throughout the structure.

In some embodiments, the materials used to form the composite structure may comprise polymer or elastomers matrix composites, metal matrix composites, ceramic matrix composites, combinations thereof, or any other suitable materials. In some embodiments, reinforcing materials or fibers in the materials may include glass, carbon, aramid, ceramics, nitrides (e.g., boron nitride), carbides (e.g., silicon carbide), combinations thereof, or any other suitable materials.

In some embodiments, the material may be pre-stretched and/or preformed prior to being applied to a tool, for example, according to the methods and devices disclosed in U.S. Pat. No. 9,266,279, issued Feb. 23, 2016, the disclosure of which is hereby incorporated herein in its entirety by this reference.

Embodiments of the present disclosure may provide methods, systems, assemblies, and apparatus related to composite tanks and forming composite tanks. In some embodiments, a composite tank may be used to store a fluid. Composite tanks may include one or more of an integral thin metallic foil or spray-on liner, a nano-tube or particle layer, or other material permeation barrier to at least partially inhibit (e.g., substantially prevent, stop) the fluid stored inside the composite tank from permeating (e.g., leaking, flowing, diffusing, etc.) through the tank wall. In some embodiments, the liner may be positioned between multiple layers or sections of composite material. The liner, and any underlying materials, may be configured to define a shape of the composite tank and form a support structure to support the composite layers.

In some embodiments, the fluid may be stored at a cryogenic temperature. For example, liquid hydrogen or liquid oxygen are generally stored under pressure at cryogenic temperatures. Large variations in temperature, such as between ambient temperature and cryogenic temperatures, may degrade structural integrity due to different coefficients of thermal expansion between a conventional bonded internal liner and the composite materials surrounding it. For example, different coefficients of thermal expansion may cause a bond between a conventional liner and the composite materials to separate, potentially creating cracks or other forms of separation through which the stored fluid may leak.

Forming composite tanks with imbedded permeation barriers to control CTE and protect the barrier, according to embodiments of the disclosure, should reduce the weight of the composite tanks and help reduce composite tank failures resulting from leakage during cryogenic cycling.

In some embodiments, the composite tank may include fittings configured to connect the composite tank to other components. The fittings may be formed from a machinable metal (e.g., steel, titanium, INVAR®, etc.). The fittings may be sealed to a port (e.g., hole, opening, passage, etc.) formed in the composite tank. The fittings may have different coefficients of thermal expansion than the composite they are bonded to, potentially resulting in cracking or a loss of the seal between the fittings and the composite tank through which the stored fluid may leak. Fittings are generally heavy and expensive, to compensate for the above noted problems, thereby increasing the weight and cost of the composite tank. In some embodiments, the composite tank may include composite fittings configured to reduce the size of the fittings and/or eliminate the need for conventional metal fittings, but these are also expensive and not easy to design for the attachment of associated loads and sealing surfaces.

FIG. 1 is a side view of a composite tank 100. As depicted, the composite tank 100 may include a main body 102. The main body 102 may be substantially cylindrical (e.g., having an annular cross section). In additional embodiments, the main body 102 may exhibit different geometric shapes (e.g., prism, polygon, cube, sphere, pyramid, cuboid, cone, octahedron, dodecahedron, etc.), or asymmetric shapes. The main body 102 may include a major dimension 110, which may extend longitudinally, and a minor dimension 112, which may extend laterally.

A stem 104 may extend from the main body 102 on one or more ends of the composite tank 100. In some embodiments, the stem 104 may be formed integrally (e.g., in the same process, from the same materials) with the main body 102. In some embodiments, the stem 104 may define a port 106 at a distal end 108 of the stem 104. The stem 104 may be at least partially hollow forming a pathway (e.g., access hatch, pass through for valves or piping connections, conduit, tube, passage, etc.) between the port 106 and the main body 102 of the composite tank 100. In some embodiments, positioning the port 106 in the distal end 108 of the stem may reduce the complexity of an interface between the composite tank 100 and a fitting. For example, a closure (not shown) may fit inside of the stem 104 with seal rings for fluid retention and then clamped, bolted or otherwise secured to the stem 104. The closure can then have penetrations through it for various functions and be prepared offline and leak tested before the closure is inserted and fastened to the stem 104.

Figure 2:
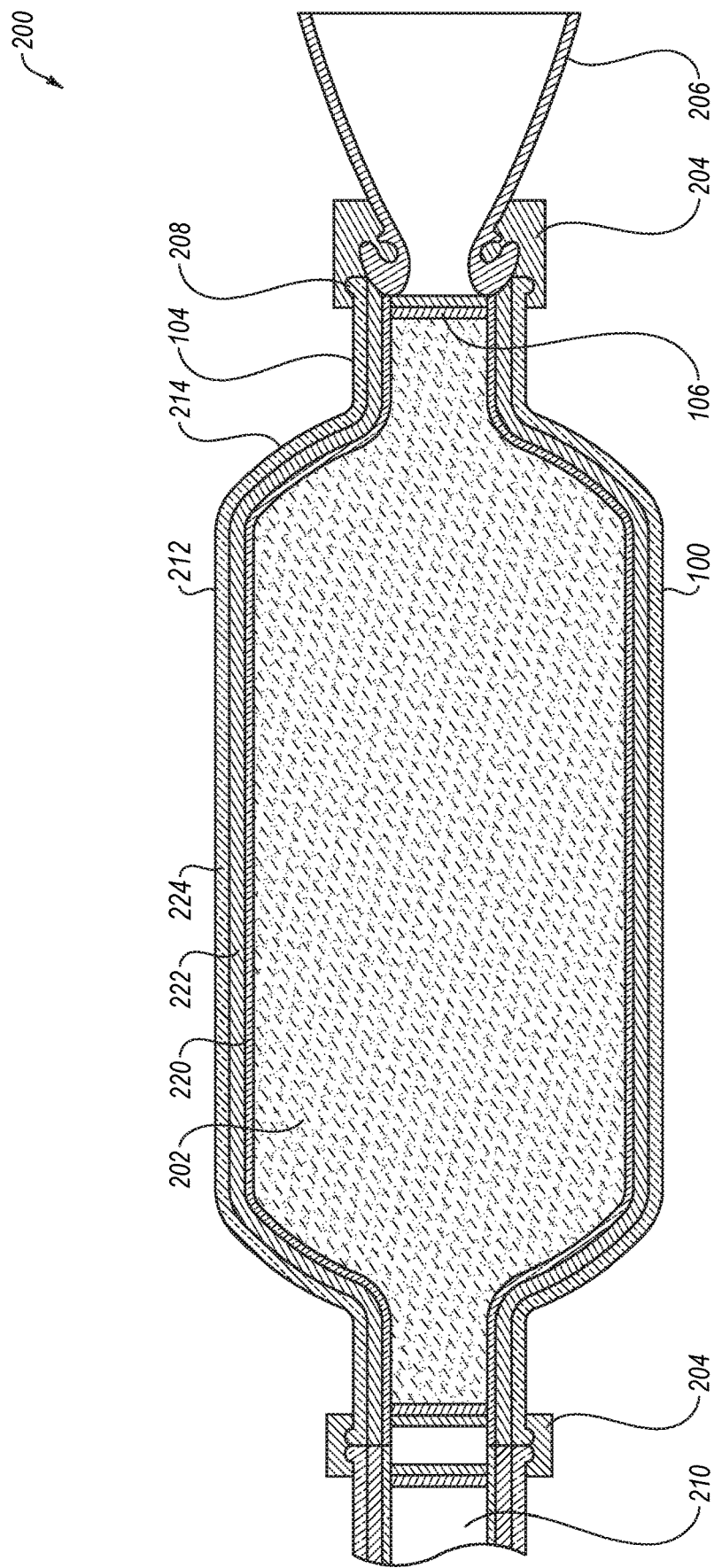
FIG. 2 is a side view of a vehicle comprising a composite storage tank with potential interfaces according to an embodiment of the present disclosure.

FIG. 2 is a cross-sectional view of an embodiment of a vehicle 200 including a composite tank 100. The vehicle 200 can use the composite storage tank 100 as part of its load structure, or the composite tank 100 can be carried independently of the load structure. The composite tank 100 may include a cylindrical wall 212 and a dome wall 214. In some embodiments, the composite tank 100 may store a fluid 202 such as a fuel (e.g., hydrogen, oxygen, hydrazine, natural gas, etc.), or life support fluids (e.g., oxygen, nitrogen, etc.). In some embodiments, a fitting 204 (e.g., coupler, union, clamp, etc.) may couple (e.g., connect, secure, fix, etc.) a component 206 (e.g., another fitting, motor, life support system, tank, fill station, etc.) to the stem 104 of the composite tank 100. For example, the stem 104 may include a securing element 208 (e.g., flange, machine threads, shoulder, flare, double flare, etc.) configured to provide a complementary securing surface to enable the fitting 204 to couple the component 206 to the stem 104. In another example, the fitting 204 may be fixed to the stem 104 with an adhesive (e.g., epoxy, glue, etc.) or mechanical attachment (e.g., interference fit, interlocking geometry, screws, nails, machine threads, etc.). The stem 104 may be connected to the component 206 such that the stem 104 and port 106 provide a fluid passageway (e.g., conduit, path, etc.) from the composite tank 100 to the component 206.

In some embodiments, a fluid conduit 210 (e.g., pipe, tube, passage, another tank, etc.) may be coupled to the stem 104. The fluid conduit 210 may transfer the fluid 202 from the composite tank 100 to the component 206 in another area of the vehicle 200. For example, the fluid conduit 210 may transfer the fluid 202 to a motor or another component that may utilize the fluid stored in the composite tank 100. In another example, the fluid conduit 210 may transfer the fluid 202 to a life support system. In some embodiments, the fluid conduit 210 may transfer fluid 202 between multiple composite tanks 100. For example, the fluid conduit 210 may act as a manifold connecting the multiple composite tanks 100 in parallel and/or series.

In some embodiments, the fluid conduit 210 may transfer the fluid from a composite tank 100 on a main vehicle to a composite tank 100 on a satellite vehicle (e.g., landing craft, landing module, propulsion pack, extravehicular mobility unit, etc.). For example, the main vehicle may be a transport vessel configured to transport people or equipment a long distance, such as to an extraterrestrial destination (e.g., the Moon, Mars, etc.). The main vehicle may be configured to remain in space (e.g., orbit, stationary, etc.) while a satellite vehicle may be configured to transport the people or equipment between the main vehicle and the surface of the extraterrestrial destination. In some embodiments, the main vehicle may be configured to remain in space for several years (e.g., more than two years, more than three years, more than four years, etc.).

In aerospace applications, such as the example above, weight reduction of each component of the vehicle may be desirable. As discussed above, conventional liners used in composite tanks to inhibit permeation of small molecule gases add significantly to the weight of the composite tank. It is also difficult to integrate internal structures with the liners. For example, some containers may include slosh baffles or stiffeners to provide a more uniform distribution of the stored material and/or add structural rigidity. Liners may require additional internal structures to be formed when the liner is formed or attached internally with hardware or by adhesion, soldering, or welding, all of which have the potential to create weak points in the liner and possible areas for leaks.

As depicted, the cylindrical wall 212 and/or the dome wall 214 of the composite tank 100 may include multiple layers or regions. The layers may include an inner composite layer 220, a barrier layer 222, and an outer composite layer 224. The inner composite layer 220 may be configured to provide an inner mounting surface for internal structures, as discussed below in greater detail. The barrier layer 222 may be formulated and configured to substantially inhibit (e.g., prevent, substantially prevent, stop) the fluid from permeating past the barrier layer 222. The outer composite layer 224 may be configured to provide structure to the composite tank 100. For example, the outer composite layer 224 may provide a majority (e.g., 70%, 80%, 90%, a substantial entirety) of the structural features (e.g., mechanics, strength) of the composite tank 100.

In some embodiments, the stem 104 may be formed in multiple layers including one, two, or all of the inner composite layer 220, the barrier layer 222, and the outer composite layer 224. For example, the layers 220, 222, 224 may form a substantially uniform main body 102 and at an end of the main body 102, the layers 220, 222, 224 may taper from a larger dimension to a smaller dimension forming the stem 104 and port 106 at the smaller dimension.

In some embodiments, the composite tank 100 may be formed without a stem 104. For example, the port 106 may be positioned in the dome wall 214. The port 106 may be configured to couple the component 206 to the composite tank 100. In some embodiments, the port 106 may be formed from a composite material, such as the same or a similar material to the composite tank 100. In some embodiments, the port 106 may be formed from a metal material. In some embodiments, the port 106 may be formed from a polymer. The port 106 may be formed from a material having a similar coefficient of thermal expansion (CTE) to the material of the composite tank 100. In some embodiments, the fitting 204 may be integral with the port 106. For example, the fitting 204 may comprise threads in the port 106 configured to receive complementary threads on the component 206. In another example, the fitting 204 may comprise a coupler (e.g., clamp, cam, locking sleeve, etc.) formed as part of the port 106 and configured to receive and secure the component 206 to the port 106. The fitting 204 may be configured to substantially seal the port 106 to the component 206. For example, the fitting 204 may include a resilient seal configured to expand and/or contract to account for differences in the coefficient of expansion between the component 206 and the port 106. In some embodiments, the fitting 204 and/or the component 206 may be formed from materials having a similar coefficient of thermal expansion to the port 106 and/or the composite tank 100 such that the seal is maintained between the component 206 and the composite tank 100 through large changes in temperature. In some embodiments the seal is designed such that the pressure in the composite tank 100 expands the seal tight against both the stem 104 and a closure.

Figure 3A:
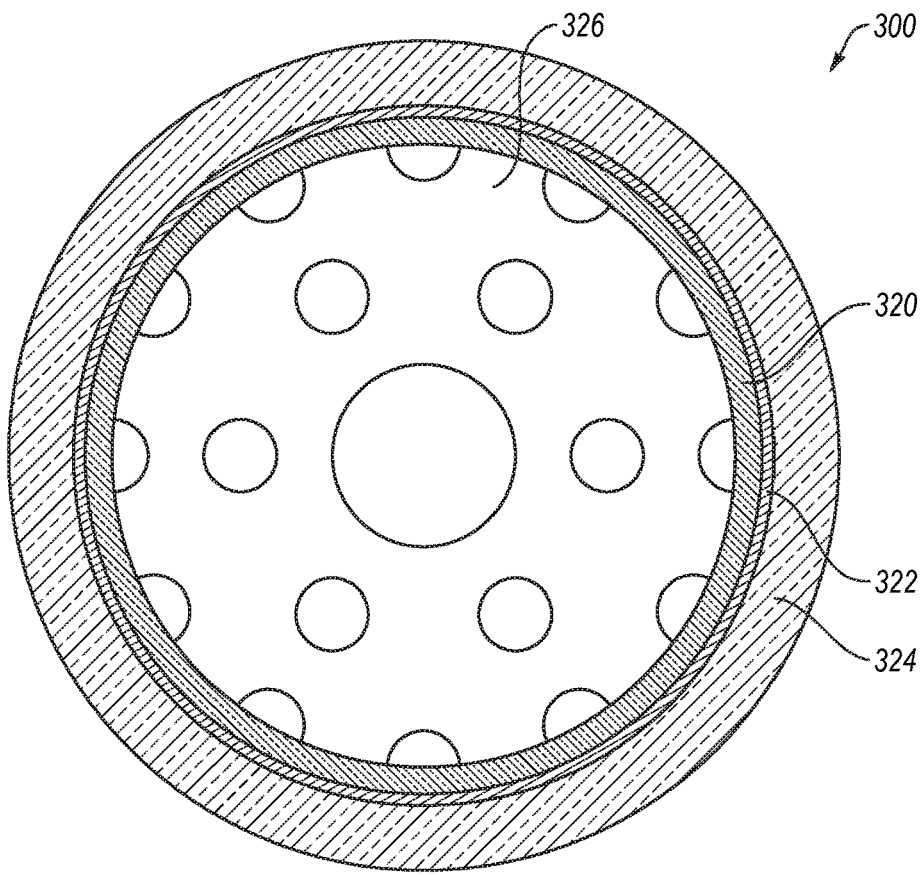
FIG. 3A is a transverse cross-sectional view of a composite tank according to an embodiment of the present disclosure.
Figure 3B:
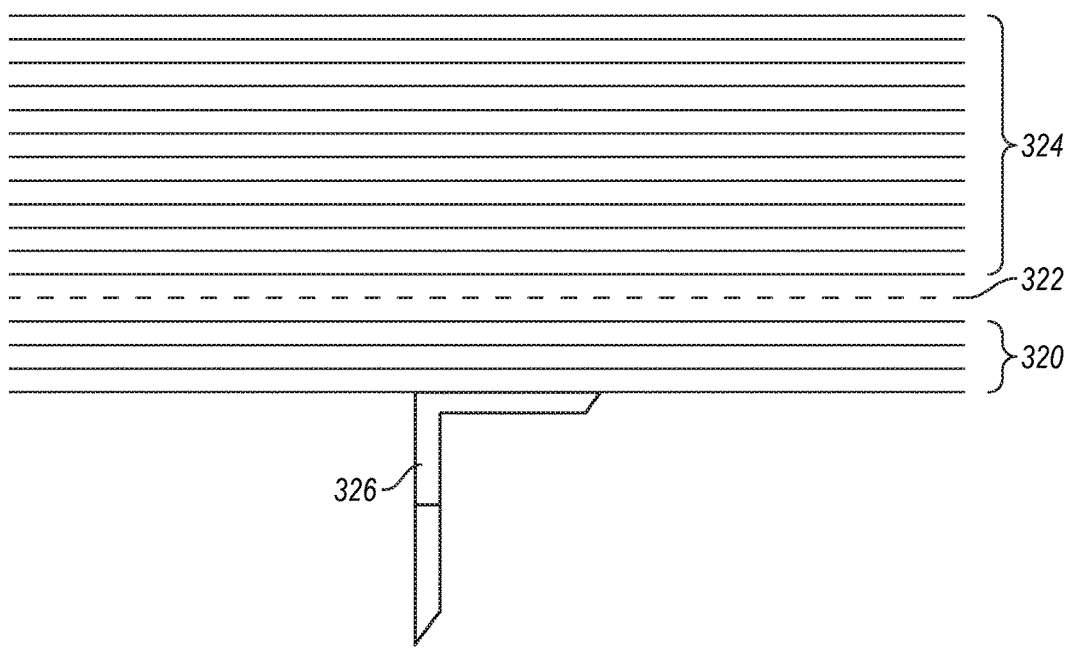
FIG. 3B is an enlarged side schematic of a side wall portion of the composite tank of FIG. 3A.

FIG. 3A is a transverse cross-sectional view of a composite tank 300 and FIG. 3B illustrates an enlarged view of a section of the cross-section adjacent a side wall of composite tank 300. It is noted that while some figures depict portions of the layer in dashed or broken lines to indicate differing materials, layers, and/or regions and do not necessarily indicate perforation in such material. As depicted in FIGS. 3A and 3B, the composite tank 300 may include at least three layers. The layers may include a relatively non-structural composite layer 320, a barrier layer 322, and a structural composite layer 324. A so-called "relatively non-structural composite layer" may be material that is thin enough and/or decoupled enough from the main structural plies by the barrier plies as to not substantially add to the mechanics (e.g., properties of the structure relating to how the structure responds to loading, stresses, and/or strains) and/or strength of the overall tank 300. In other embodiments, such a layer may be coupled with the liner and outer structural shell such that it adds to the structural performance of the tank outer structural function. For example, the relatively non-structural composite layer 320 may make only a minor to substantially no contribution to the mechanics and/or strength of the overall tank 300, while the structural composite layer 324 makes a major contribution to the mechanics and/or strength of the overall tank 300.

In some embodiments, the relatively non-structural composite layer 320 may be at least partially permeable (e.g., may be designed to let at least some fluid through the material and/or may include openings where the fluid may freely pass). In some embodiments, micro-cracks may naturally form in the matrix material around fibers in the composite material creating paths for small molecular gases to migrate through the laminate.

The composite tank 300 may include internal structural components 326 (e.g., baffles, stiffeners, framework, etc.). The relatively non-structural composite layer 320 may provide a mounting surface to secure the internal structural components 326 without leak concerns as the relatively non-structural composite layer 320 is not necessary or designed for at least partially preventing leaking of the fluid. For example, internal structural components 326 may be mounted to the relatively non-structural composite layer 320 with hardware (e.g., screws, bolts, rivets, etc.), adhesives (e.g., glue, epoxy, etc.), or mounting flanges (e.g., shoulders, grooves, etc.). Because the relatively non-structural composite layer 320 is not configured to prevent permeation of the fluid, punctures, cracks, holes, etc., in the relatively non-structural composite layer 320 resulting from mounting the internal structural components 326 may not substantial affect the permeation of fluid through the composite tank 300. In some embodiments, the relatively non-structural composite layer 320 may comprise relatively fewer plies than the structural composite layer 324. For example, the non-structural composite layer 320 may comprise between about one ply and about sixteen plies, such as between about two plies and about four plies or between about four plies and about eight plies.

The barrier layer 322 may be positioned between (e.g., directly sandwiched between) the relatively non-structural composite layer 320 and the structural composite layer 324. The barrier layer 322 may be formulated and configured to substantially inhibit permeation of fluid (e.g., small molecular gases). The barrier layer 322 may comprise a material such as a metallic foil layer, a continuous metallic layer (e.g., metallic coating, metallic paint, metal plating, etc.), a nano-particle based layer, polymer film layer, or multiple thin composite laminate layers. In some embodiments, the barrier layer 322 may include an adhesive (e.g., glue, epoxy, etc.) formulated to secure the barrier layer 322 to at least one of the relatively non-structural composite layer 320 and the structural composite layer 324 during assembly. In some embodiments, the barrier layer 322 may include a matrix material (e.g., resin, epoxy, etc.) formulated to secure the barrier layer 322 to at least one of the relatively non-structural composite layer 320 and the structural composite layer 324 during the curing process. In some embodiments, the barrier layer 322 may be applied through a spraying process (e.g., powder spray, liquid spray, metal spray, etc.). In some embodiments, the barrier layer 322 may be applied through a plating process (e.g., electroless plating, electroplating, etc.) and/or a deposition process (e.g., a chemical vapor deposition (CVD) process, an atomic layer deposition (ALD) process, etc.).

In some embodiments, the barrier layer 322 may comprise multiple materials. For example, a continuous metallic layer, which is applied to one of the adjacent composite layers, may be used in conjunction with a standalone metallic foil layer, and/or a polymer film layer. In another example, a metallic foil layer may be used in conjunction with a nano-particle based layer, or multiple thin composite laminate layers.

As depicted, the barrier layer 322 may be located between (e.g., sandwiched, surrounded by, encompassed by, bordered by, etc.) the relatively non-structural composite layer 320 and the structural composite layer 324. The barrier layer 322 may be substantially thinner (e.g., exhibit a relatively lesser thickness, taken in a lateral or radial direction from a longitudinal axis of the composite tank 300) than both the relatively non-structural composite layer 320 and the structural composite layer 324. The barrier layer 322 may be formulated and configured to be non-structural (e.g., provide minor to substantially no structural support to the composite tank 300) and be substantially supported by one or more of the non-structural composite layer 320 and the structural composite layer 324, or it may be designed to couple with the inner relatively nonstructural layer and the structural layer to add to the mechanical strength/performance of the tank, such as could be the case with multiple thin composite layers. In other embodiments one or more the barrier layers may be placed at the center of laminated composite layers (equally spaced between inner and outer composite regions).

In some embodiments, the structural composite layer 324 may comprise multiple plies of composite material. The structural composite layer 324 may be formed from substantially more plies than the relatively non-structural composite layer 320. For example, the structural composite layer 324 may be formed from four or more plies, such as eight or more plies, sixteen or more plies, or thirty two or more plies. In some embodiments, the plies of composite material may be applied in different orientations (e.g., such that the fiber in each ply are not parallel to the fibers in an adjacent ply) in order to provide the composite tank 300 with a selected structural mechanic or strength. For example, the plies of composite material may be applied such that the fibers in each ply are rotated 45 degrees to the fibers in the adjacent plies.

In further embodiments, the barrier layer may be placed at any position between an inner composite region and an outer composite region. In one embodiment, a barrier layer may be kept closer to the inner surface of the tank and thereby allow the outer composite region to be designed to carry most all of the loads. In another embodiment, the barrier layer may be placed at the mid tank thickness (with substantially the same thickness of composite material at the inner and outer composite regions), thereby placing it at a low-stress region of the tank laminate, and using both the inner and outer composite regions as structural load bearing laminates.

In some embodiments, the structural composite layer 324 may be configured to secure the composite tank 300 to a framework (e.g., frame of a vehicle, stationary frame secured to a surface, etc.). For example, the structural composite layer 324 may include reinforced sections. For example, the reinforced sections may include additional materials (e.g., additional plies of the composite material), different materials (e.g., metal bands, metal pieces, polymer pieces, etc.) or reinforcing forms (e.g., ribs, flanges, gussets, shoulders, etc.). In some embodiments, the structural composite layer 324 may include an integral frame (e.g., unibody). For example, the structural composite layer 324 may substantially comprise a framework about the composite tank 300 configured for attachment of the framework to portions of a frame of a vehicle with the framework substantially supporting the composite tank 300 between the portions of the frame of the vehicle. In some embodiments on or more composite tank 300 becomes part of the vehicle structure and carries loads between a forward portion and a rear portion of the vehicle.

Figure 4A:
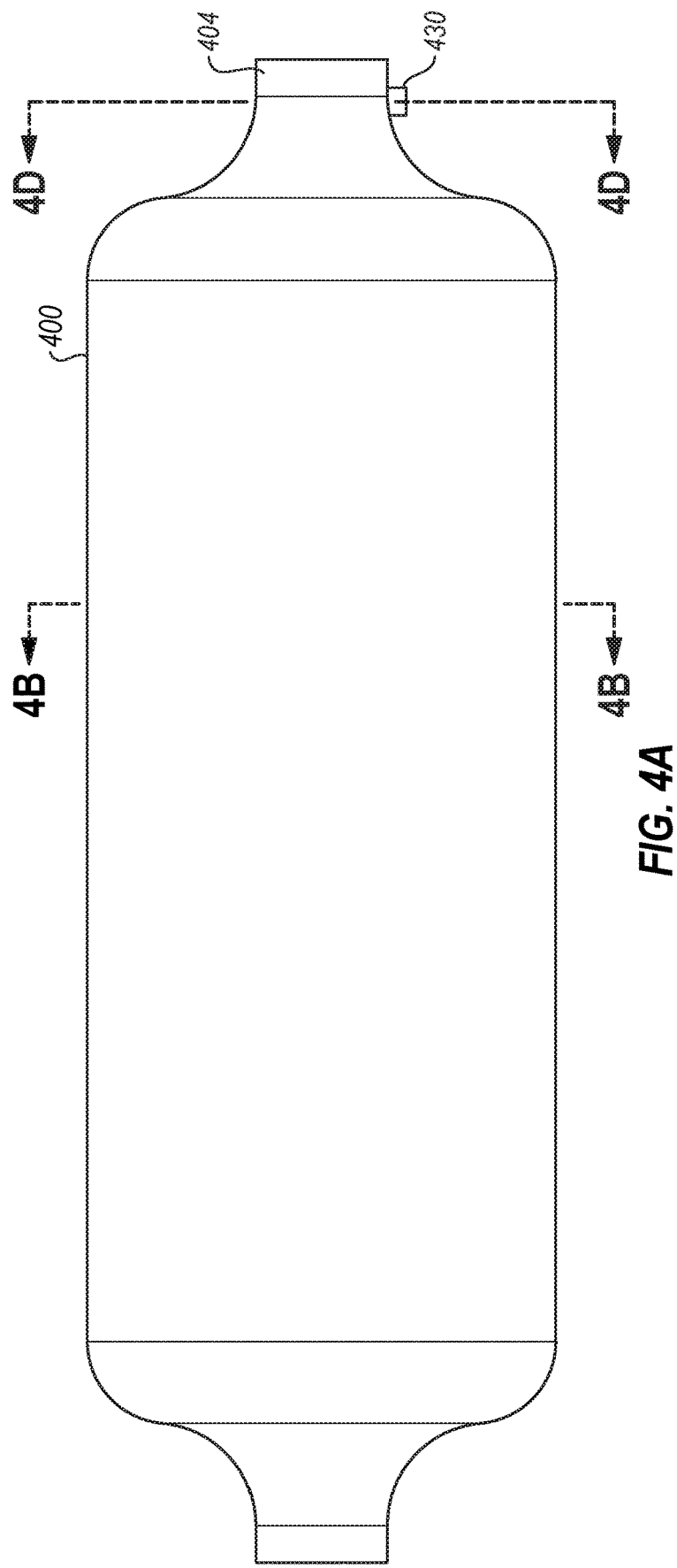
FIG. 4A is a side view of a composite storage tank according to an embodiment of the present disclosure.
Figure 4B:
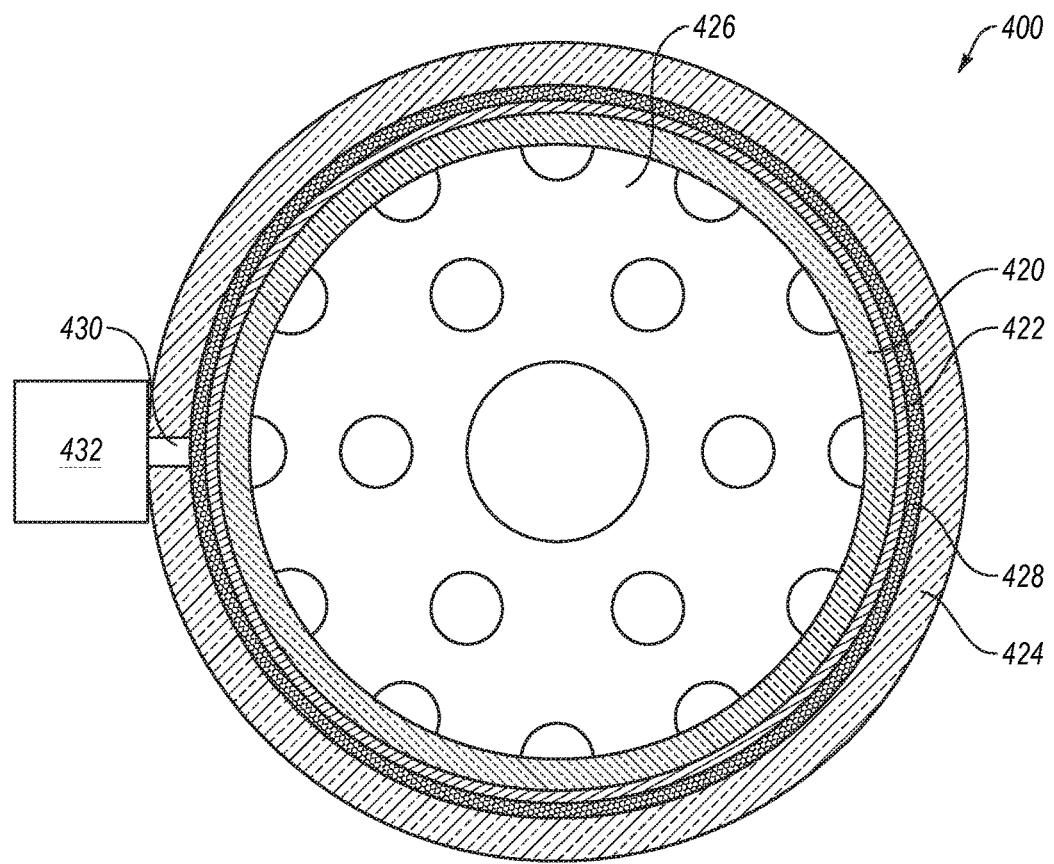
FIG. 4B is a transverse cross-sectional view of the composite tank of FIG. 4A along the line 4B.
Figure 4C:
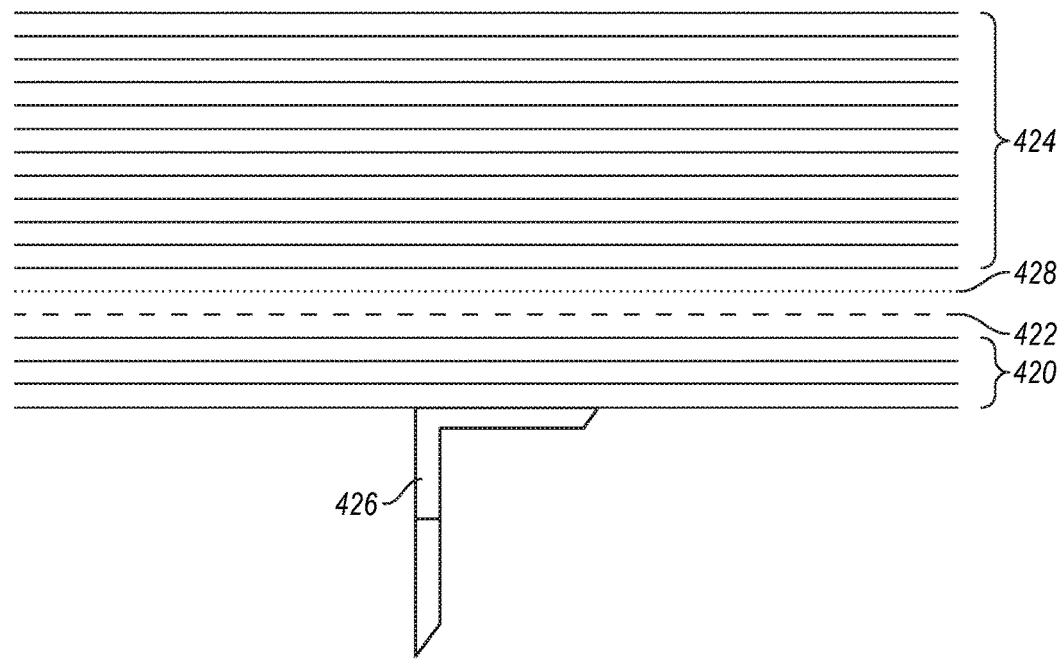
FIG. 4C is an enlarged side schematic of a side wall portion of the composite tank of FIG. 4B.

FIG. 4A is a side view of an embodiment of a composite tank 400. FIG. 4B is a cross section of the composite tank 400 along line 4B and FIG. 4C is an enlarged view of a section of the cross section. As depicted, the composite tank 400 may include at least four layers or regions. For example, the layers may include a relatively non-structural composite layer 420, a barrier layer 422, a venting layer 428, and a structural composite layer 424.

In some embodiments, the relatively non-structural composite layer 420 may be similar to the non-structural composite layer 320 described above with respect to FIGS. 3A and 3B. The non-structural composite layer 420 may provide a mounting surface for internal structures 426, such as baffles and stiffeners. The non-structural composite layer 420 may be the innermost layer of the composite tank 400. The barrier layer 422 may be the next, adjacent layer. In some embodiments, the barrier layer 422 may be similar to the barrier layer 322 described above with respect to FIGS. 3A and 3B. The barrier layer 422 may substantially inhibit permeation of the fluid stored in the composite tank 400.

In certain instances, intentionally and/or unintentionally, some of the fluid stored within the composite tank 400 may permeate through the barrier layer 422. As described above, the fluid stored within the composite tank 400 may be a volatile or otherwise dangerous fluid.

The venting layer 428 may be adjacent the barrier layer 422. The venting layer 428 may be formed from a permeable material (e.g., a gas permeable material). The venting layer 428 may be formed from materials that stop liquids, but enable gasses to pass through and travel through the venting layer 428 (e.g., GORETEX® material, VAP® material, open cell foam, ceramics, etc.). The venting layer 428 may be configured to provide one or more venting passages (e.g., pathways) for any gas molecules that may permeate through the barrier layer 422. The venting passages may direct the gas molecules to a controlled evacuation feature 430 (e.g., vent) in an area where any dangerous characteristics inherent in the fluid may be controlled (e.g., minimized, directed). For example, a volatile liquid may be directed away from a catalyst (e.g., combustion source, catalytic substance, etc.) associated with composite tank 400. In some embodiments, the evacuation feature 430 may be a port (e.g., hole, conduit, fitting, etc.) configured to provide a pathway for the gas in the venting layer 428 through the structural composite layer 424 to an exterior portion of the composite tank 400 at a middle portion and/or end portion of the composite tank 400. The port may be connected to another component of a vehicle to which the composite tank 400 is secured or to external equipment by a fluid conduit. In some embodiments, the evacuation feature 430 may comprise a series of ports. For example, the evacuation feature 430 may include a series of ports arranged radially around the periphery of an end of the composite tank 400. In another example, the evacuation feature 430 may include a series of ports arranged longitudinally along the major dimension 110 (FIG. 1) of the composite tank 400.

In some embodiments, a vacuum feature may be applied to the venting layer 428 through the evacuation feature 430 such that any fluid present in the venting layer 428 may be evacuated to and by the vacuum source 432. In some embodiments, the vacuum source 432 may comprise external equipment and the vacuum feature may be applied and/or maintained by the external equipment. In other embodiments, the vacuum source 432 may be provided by ambient environmental conditions (e.g., the vacuum of space).

In some embodiments, the venting layer 428 may include one or more plies of composite material to support the barrier layer 422 (e.g., maintained in position, secured, etc.). In some instances, the vacuum feature applied to the venting layer 428 may displace (e.g., move, unattached, delaminate, etc.) an unsupported barrier layer 422. In some embodiments, the barrier layer 422 may have sufficient rigidity, or support that an intervening supporting layer of composite material is unnecessary.

The structural composite layer 424 may be positioned over an exterior or outward portion of the venting layer 428. For example, the structural composite layer 424 may secure the venting layer to the inner layers (e.g., non-structural composite layer 420, barrier layer 422, and/or intervening supporting layers of composite material). In some embodiments, the structural composite layer 424 may be similar to the structural composite layer 324 described above with respect to FIGS. 3A and 3B.

Figure 4D:
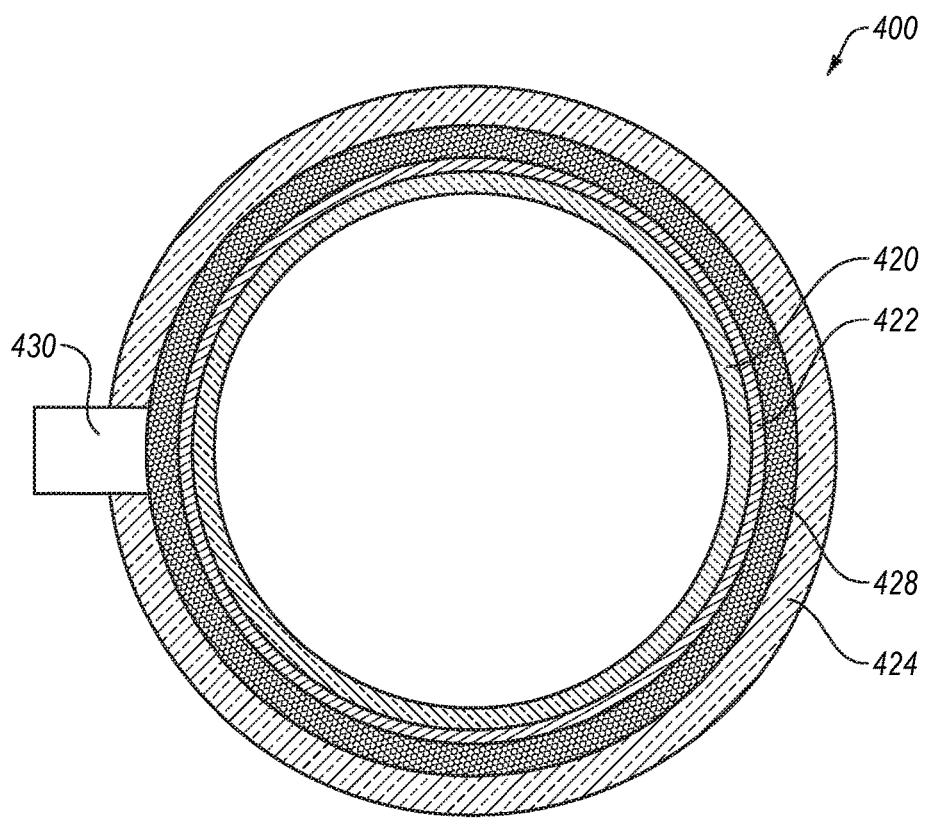
FIG. 4D is a transverse cross-sectional view of the composite tank in FIG. 4A along the line 4D.
Figure 4E:
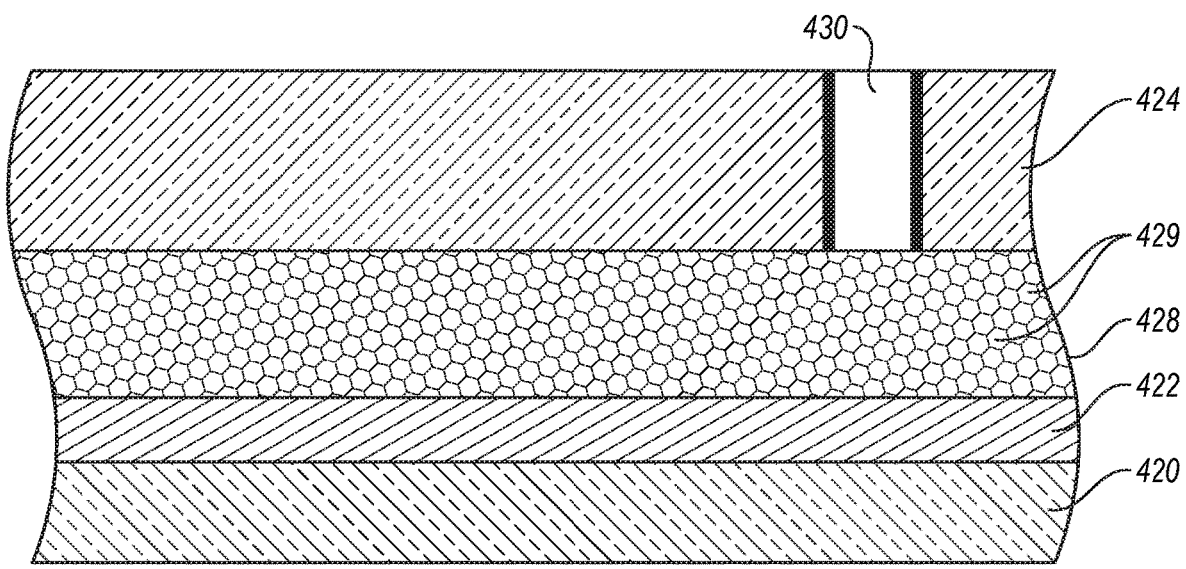
FIG. 4E is an enlarged cross-sectional view of a portion of the composite tank of FIG. 4D.

FIG. 4D is a cross-sectional view of a stem 404 of the composite tank 400 along the line 4D. FIG. 4E is an enlarged view of a portion of the cross section of the stem 404 illustrating the venting layer 428 (e.g., a cross section along a length of the stem 404). As depicted, the controlled evacuation feature 430 may be located in the stem 404. In some embodiments, the controlled evacuation feature 430 may be located in the main body of the composite tank 400 as illustrated in FIG. 4B. In some embodiments, controlled evacuation features 430 may be located in multiple positions including the stem 404 and the main body of the composite tank 400.

The venting layer 428 may include a material (e.g., an open cell material) having a plurality of pores 429 (e.g., capillaries, holes, paths, voids, micro-structures, nano-structures, etc.). The plurality of pores 429 may provide mobility (e.g., migration path, pathway, etc.) for fluid within the venting layer 428. The fluid may enter the venting layer 428 through the barrier layer 422 or another portion of the composite tank 400. The fluid may travel through the plurality of pores 429 to the controlled evacuation feature 430. The fluid may exit the venting layer 428 through the controlled evacuation feature 430.

FIG. 5 illustrates an enlarged schematic side view of a section of a cross-section of an embodiment of a composite tank 500. As depicted, the composite tank 500 may include a first composite layer 520, one or more barrier layers 522a, 522b, 522c, one or more venting layers 528a, 528b, and a second composite layer 524.

In some embodiments, the first composite layer 520 may be similar to the non-structural composite layer 320, 420 described above with respect to FIGS. 3A through 4B. The first composite layer 520 may provide a mounting structure for inner structural components 526 (e.g., baffles, stiffeners, cross-braces, etc.). In some embodiments, the first composite layer 520 may be structural (e.g., provide structural support to the composite tank 500). For example, the first composite layer 520 may be formed with integral structural components (e.g., reinforced sections) such as, additional plies of composite material, different material, and/or reinforcing forms in high stress regions. In another example, the first composite layer 520 may include at least the same number of plies as the second composite layer 524. In some embodiments, the first composite layer 520 may include reinforcing forms configured to support (e.g., provide structural support) the first composite layer 520 and/or the second composite layer 524.

The barrier layers 522a, 522b, 522c may be formed from materials formulated and configured to substantially inhibit permeation of the fluid being stored by the composite tank 500. In some embodiments, the barrier layers 522a, 522b, 522c may be formed from substantially the same material. In other embodiments, the barrier layers 522a, 522b, 522c may be formed from different materials. For example, a first barrier layer 522a may be formed from a metallic foil, a second barrier layer 522b may be formed from a polymer film, and a third barrier layer 522c may be formed from a metallic coating. In another example, the first barrier layer 522a may be formed from multiple thin composite layers, the second barrier layer 522b may be formed from a nanoparticle based layer, and the third barrier layer 522c may be formed from a polymer film. The barrier layers 522a, 522b, 522c may be formed from any suitable combination of barrier materials.

The venting layers 528a, 528b may be formed from materials configured to enable the fluids stored in the composite tank 500 to permeate laterally through the venting layers 528a, 528b to an evacuation port or exhaust. In some embodiments, the venting layers 528a, 528b may be formed from the same venting materials. In other embodiments, the venting layers 528a, 528b may be formed from different venting materials. For example, the first venting layer 528a may be formed from a venting material that is more restrictive (e.g., with a smaller mean free path) than the second venting layer 528b. In another example, the first venting layer 528a may be formed from a venting material that is less restrictive than the second venting layer 528b.

In some embodiments, the first venting layer 528a and the second venting layer 528b may be connected to common external vents. In some embodiments, the first venting layer 528a and second venting layer 528b may be connected to separate external vents. In some embodiments, one or more of the venting layers 528a, 528b may have a vacuum feature (e.g., vacuum source 432 (FIG. 4A)) at least partially applied to the venting layer 528a, 528b, for example, as discussed above in reference to FIGS. 4A and 4B. For example, the vacuum feature may be applied to the first venting layer 528a by an external vacuum source configured to evacuate any gas or other material from the first venting layer 528a. In some embodiments, both the first venting layer 528a and the second venting layer 528b may have a vacuum feature applied by the same vacuum source. In some embodiments, the first venting layer 528a and the second venting layer 528b may have a vacuum feature applied by different vacuum sources.

In some embodiments, the second composite layer 524 may be structural. For example, the second composite layer 524 may be configured to maintain the one or more barrier layers 522a, 522b, 522c and the one or more venting layers 528a, 528b between the first composite layer 520 and the second composite layer 524 by encapsulating (e.g., sandwiching, bordering, etc.) the one or more barrier layers 522a, 522b, 522c and the one or more venting layer 528a, 528b through contact with an outermost venting or third barrier layer 522c while the first composite layer 520 contacts (e.g., supports) the one or more barrier layers 522a, 522b, 522c and the one or more venting layer 528a, 528b through contact with an innermost venting or barrier layer 522a. The alternating barrier layers 522a, 522b, 522c and venting layers 528a, 528b may form redundant barriers (e.g., double redundancy, triple redundancy, etc.) configured to substantially prevent uncontrolled leakage from the composite tank 100. In some embodiments, the second composite layer 524 may be similar to the structural composite layer 324, 424 as described in FIGS. 3A through 4B. In some embodiments, the second composite layer 524 may be non-structural. For example, the second composite layer 524 may include fewer plies of composite material than the first composite layer 520.

In some embodiments, the first composite layer 520, one or more barrier layers 522a, 522b, 522c, the one or more venting layers 528a, 528b, and the second composite layer 524 may form a wall (e.g., bulkhead) between two different fluids. In some embodiments, the two different fluids may be volatile if mixed (e.g., hydrogen and oxygen). The first venting layer 528a may vent a first fluid bordered by the first composite layer 520 that permeates through the first barrier layer 522a. The second venting layer 528b may vent a second fluid bordered by the second composite layer 524 that permeates through the third barrier layer 522c. The second barrier layer 522b may act as a final barrier separating the two venting layers 528a, 528b such that the small amount of first and second fluids that permeate through the first barrier layer 522a and the second barrier layer 522b do not mix within the wall. The two venting layers 528a, 528b may be separately vented. For example, the vents may be on opposite ends of the composite tank 100 and/or may include separate vacuum sources to further prevent mixing of the first and second fluid.

In some embodiments, a composite storage tank may have multiple composite laminates or wall structures separated by light-weight core materials (e.g., honeycomb core, foam core, pin core, 3-D printed core, etc.) to create a sandwich structure for added stiffness and reduced weight. For example, an inner skin of the sandwich structure can include an inner region, a permeation barrier, and an outer region, and the outer skin may have the same architecture, or may be only one material. In such embodiments, the core structure can be vented to atmosphere or a vacuum applied to manage any gas molecule leakage past the inner skin and permeation barrier combination for redundant safety.

Figure 6:
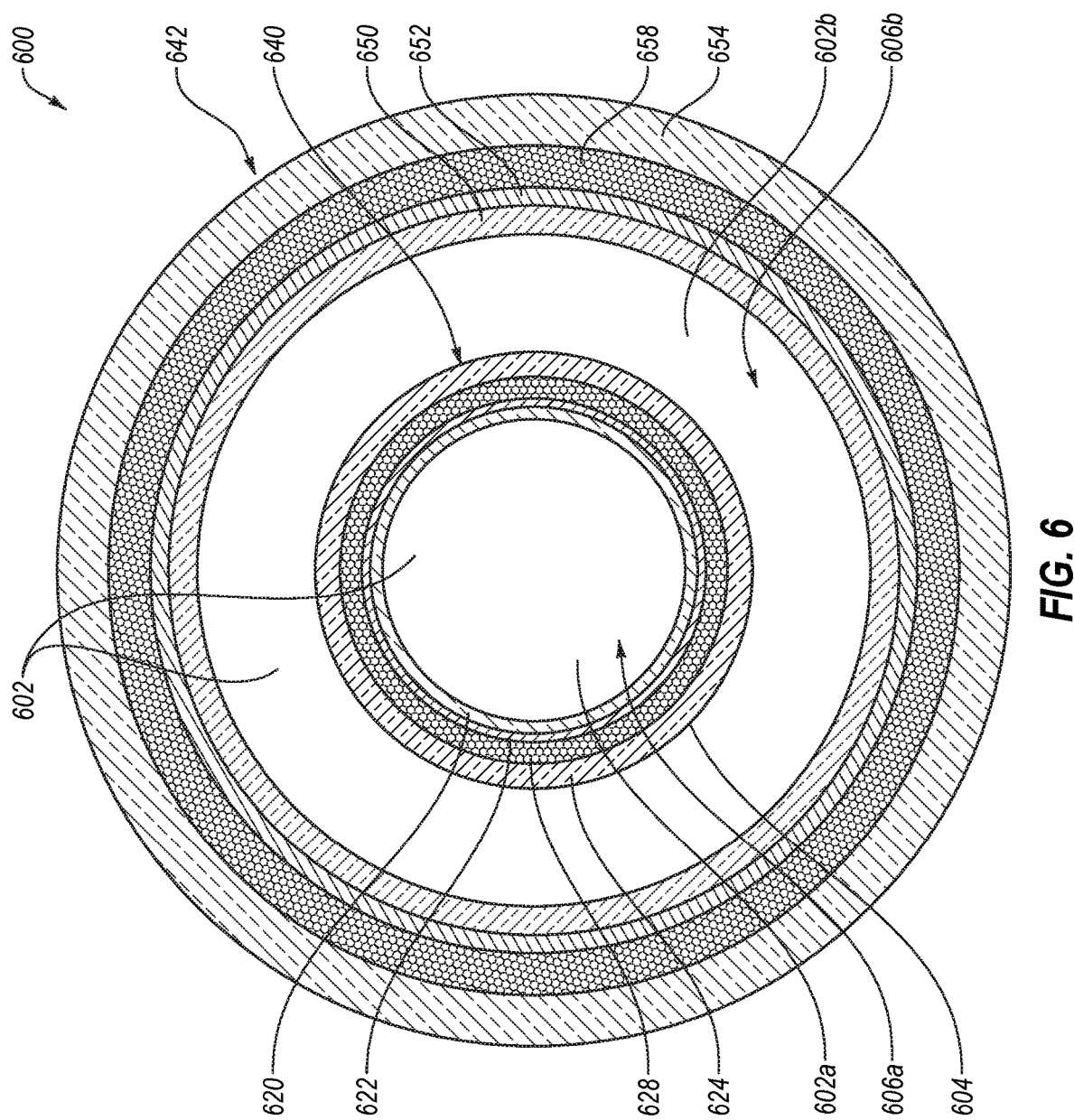
FIG. 6 is a transverse cross-sectional view of a composite tank according to an embodiment of the present disclosure.

FIG. 6 illustrates a transverse cross-sectional view of a composite tank 600. As depicted, the composite tank 600 may include multiple chambers 602 (e.g., volumes) contained within the composite tank 600 (e.g., nested chambers, concentric chambers, side by side, shared walls or bulkheads, chambers, etc.). The composite tank 600 may include an inner composite structure or wall 604 separating (e.g., isolating) the multiple chambers 602. For example, the multiple chambers 602 may hold different fluids and the inner composite wall 604 may at least substantially inhibit permeation of a first fluid 606a in a first chamber 602a into contact with a second fluid 606b in a second chamber 602b. As depicted, the inner composite wall 604 may include a first composite layer 620 and a second composite layer 624 and may be the same as layers 220, 224, 320, 324, 420, 424, 520, and 524 discussed above. The inner, first composite layer 620 may be formed from a composite material having properties that are configured to withstand an environment present in the first chamber 602a of the composite tank 600 and the outer, second composite layer 624 may be formed from a similar or different composite material having properties that are configured to withstand a different environment present in the second chamber 602b of the composite tank 600. In some embodiments, at least one of the first composite layer 620 and the second composite layer 624 may be a structural layer configured to provide a selected structural mechanic or strength to the inner composite wall 604 separating the multiple chambers 602.

In some embodiments, the composite structure or wall 604 may include one or more venting layers 628 (e.g., the single or multiple venting layers) with a single common vent or multiple vents and optional vacuum features, as discussed above.

The inner composite wall 604 may form a first composite structure 640 (e.g., composite tank, storage tank, container) fully encapsulated (e.g., contained, bordered, enclosed) within a second composite structure 642. The first composite structure 640 may include the first composite layer 620 and the second composite layer 624 bordering at least one barrier layer 622 and at least one venting layer 628. The barrier layer 622 and venting layer 628 may be configured in any arrangement, such as the arrangements discussed above with respect to FIGS. 3A through 5. The second composite structure 642 may include an inner composite layer 650 and an outer composite layer 654 bordering at least one barrier layer 652 and at least one venting layer 658. The barrier layers 652 and venting layers 658 may be configured in any arrangement, such as the arrangements discussed above in FIGS. 3A through 5. In some embodiments, the second composite structure 642 may be constructed without a venting layer 658 as described above with respect to FIGS. 3A and 3B.

In some embodiments, the second composite structure 642 may encapsulate multiple composite structures similar to the first composite structure 640. For example, the first composite structure 640 may be adjacent to another composite structure, and both the first composite structure 640 and the other composite structure may be fully encapsulated within the second composite structure 642. In some embodiments, the first composite structure 640 may encapsulate additional composite structures of similar construction within the first composite structure 640.

In some embodiments, the composite tank may be formed as a composite structure with a substantially cylindrical structure (e.g., having an annular cross section). In some embodiments, the composite tanks may have varying diameters (e.g., from the main body 102 to the stem 104 (FIG. 1)).

Figure 7:
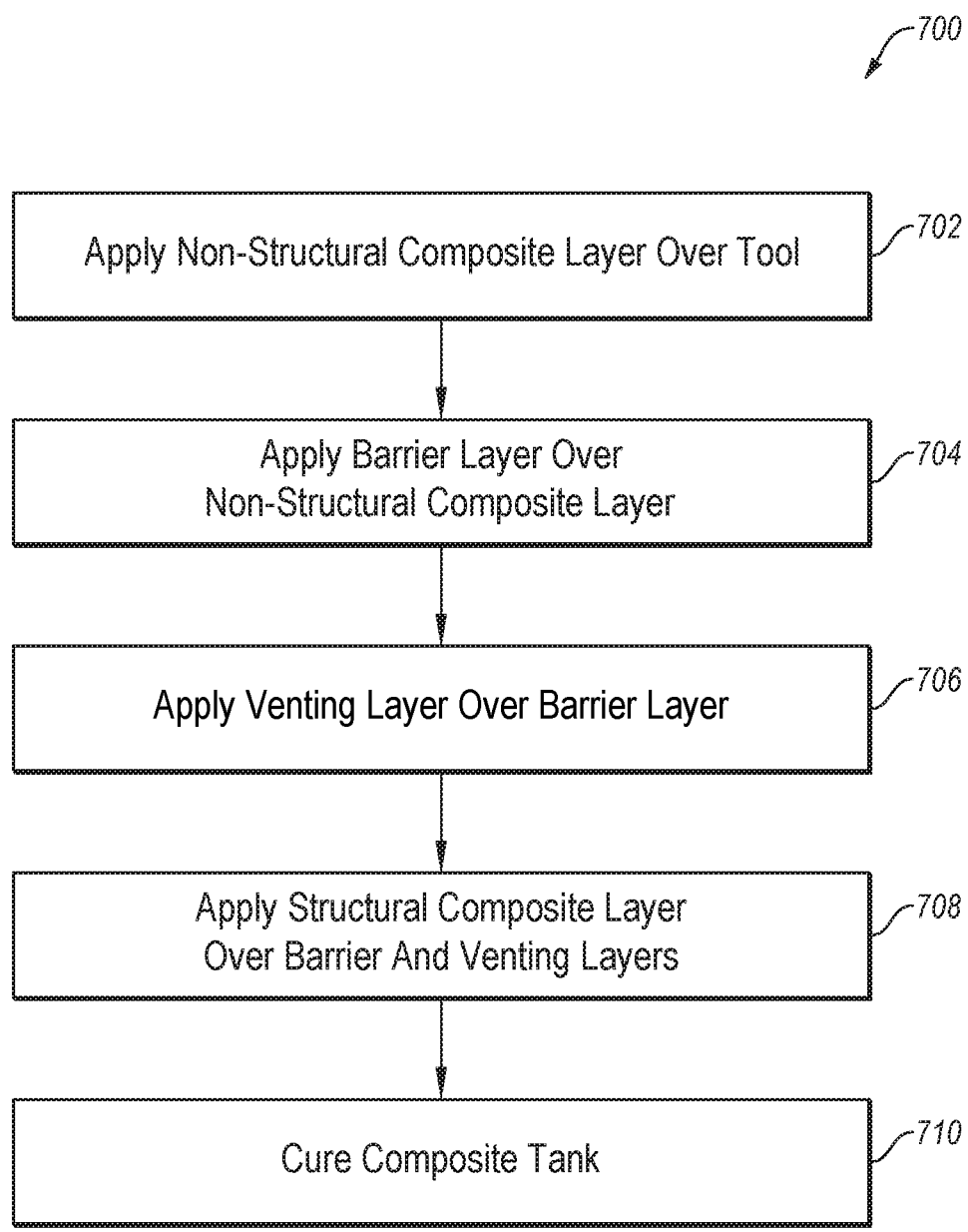
FIG. 7 is a flow diagram of a process of forming a composite tank according to an embodiment of the present disclosure.

FIG. 7 is a flow diagram of a forming process for a composite tank 700. Referring also to FIGS. 4A and 4B, the layers 420, 422, 428, and 424 may be formed over a tool (e.g., mandrel, buck, etc.) configured to provide an internal shape (e.g., geometric shapes, asymmetric shapes, substantially cylindrical shape, etc.) for the composite tank 700.

The non-structural composite layer 420 may be applied over the tool through a composite forming process, as represented in act 702. In some embodiments, the non-structural composite layer 420 may be formed through a composite lay-up process (e.g., filament winding, automated fiber placement, tape-laying process, or other suitable process). For example, the tool may rotate while the composite fibers (e.g., carbon fibers, glass fibers, impregnated fibers, etc.) are wound under tension onto the tool. In another example, the tool may remain stationary and the fibers may be applied to the tool by rotating a fiber distribution system around the tool. The fiber distribution system may travel longitudinally along the tool applying the fibers in substantially helical pattern (e.g., diagonal, spiral, etc.). In another embodiment, the non-structural composite layer 420 may be applied through a lay-up process wrapping sheets or plies of composite mat (e.g., carbon mesh, glass mat, pre-preg, etc.) around the tool. Once the desired thickness (e.g., number of layers, number of plies) for the non-structural composite layer 420 is reached, the barrier layer may be applied. In some embodiments, the non-structural composite layer 420 may be cured (e.g., in an autoclave or out-of-autoclave process) before applying the barrier layer. For example, the non-structural composite layer 420 may be cured and the internal structures 426 may be attached thereto before applying the barrier layer. In some embodiments, the non-structural composite layer 420 may remain in an uncured state while the other layers are applied.

In some embodiments, the non-structural composite layer 420 may be formed in an automated process configured to maintain a substantially uniform thickness of the non-structural composite layer 420 through each region (e.g., cylindrical wall 212, dome wall 214, and the stem 104 (See FIG. 2)), while forming each region integrally with the other regions. For example, the non-structural composite layer 420 may be formed from an automated tow placement (ATP), often known as automated fiber placement (AFP) or automated tape-laying (ATL) process. As dimensions of the composite tank are reduced (e.g., from the cylindrical wall 212 to the stem 104), the number of tape strips (e.g., tows) may be reduced through a process, such as dropping tows, such that the smaller dimension maintains substantially the same thickness as the larger dimension. In another example, multiple processes may be used to form different sections of the non-structural composite layer 420. The larger dimension portions of the composite tank (e.g., cylindrical wall 212 and dome wall 214) may be formed using automated fiber placement (AFP) or automated Tape Laying (ATL). The process may then be transitioned to AFP or more of a filament winding (stand-off winding) mode to form the smaller dimension portions (e.g., stem 104).

The barrier layer 422 may be applied over the non-structural composite layer, as represented in act 704. In some embodiments, the barrier layer 422 may be applied through a similar process as the plies of the non-structural composite layer 420. For example, the barrier layer may be applied by wrapping sheets of barrier material (e.g., metal foil, polymer film, or composite laminate). In some embodiments, the barrier layer 422 may be applied, through a different process (e.g., spraying, painting, plating, adhesion, etc.) after the plies of the inner non-structural composite layer 420 are applied. In some embodiments, the non-structural composite layer may be removed from the forming tool to have the barrier layer 422 applied through the different process (e.g., spraying, painting, plating, etc.). In other embodiments, the barrier layer may be applied over the non-structural composite layer 420 while the non-structural composite layer 420 remains on the tool.

The venting layer 428 may be applied over the barrier layer 422, as represented in act 706. The venting layer may be applied in a similar manner to the non-structural composite layer 420 and/or the barrier layer 422. In some embodiments, additional barrier layers 422 and venting layers 428 may be applied in alternating acts forming multiple barrier layers 422 and venting layers 428 as described in the embodiments of FIG. 5.

After the final venting layer 428 and/or barrier layer 422 is applied, the structural composite layer 424 may be applied over the preceding layers, as represented in act 708. Similar to the non-structural composite layer 420, the structural composite layer 424 may be applied in at least one of a filament winding, automated fiber placement or a lay-up process. The structural composite layer 424 may be applied until a desired thickness (e.g., number of plies) is reached to provide the necessary structural mechanic or strength for the composite tank 400. Similar to the non-structural composite layer 420 discussed above, the structural composite layer 424 may be applied through an automated process configured to maintain a substantially uniform thickness through integrally formed regions having different dimensions (e.g., cylindrical wall 212, dome wall 214, and stem 104 (FIG. 2)). Once all the layers are applied to the desired thickness, the entire composite tank 400 may be cured, as represented in act 710. The curing process may include, for example, a heating process, a vacuum bagging process, an autoclave or out-of-autoclave process, etc. In some embodiments, the layers 420, 422, 424, and 428 may be cured together in a single process. In other embodiments, the layers 420, 422, 424, and 428 may be cured in individual processes during assembly (e.g., each layer may be individually cured before applying the next layer).

Composite tanks are often used in aerospace applications for storing and distributing different fluids such as fuels that are used by the aerospace vehicles. Reductions in weight for the composite tanks enable vehicles to transport a larger amount of fluids extending the available time and/or distance that the vehicles can travel before needing to return and refuel. Conventional composite tanks have required an innermost liner that may add significant amounts of weight, may become detached from the surrounding composite material of the tanks, and may not effectively prevent the permeation of small molecule fluids commonly used as aerospace fuels through the walls of the composite tanks. Embodiments of the present disclosure may enable composite tanks to be built without a conventional liner while maintaining a composite wall structure that substantially prevents the permeation of small molecule fluids. The weight reduction coupled with leakage prevention and greater reliability may enable a vehicle employing a composite tank according to the present disclosure to travel extended distances and for extended periods of time. In aerospace applications, such tanks may result in vehicles capable of delivering cargo (e.g., equipment, passengers, etc.) to distant destinations such as the Moon and/or Mars. The composite cryotank wall constructions describe herein provide for safety redundancy designs to help manage risk with these types of structures containing highly flammable/explosive fluids (mixed liquid and gas phases).

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A composite storage tank comprising:
   a wall structure including at least three regions comprising:
      an inner region comprising a first composite material;
      an outer region comprising a second composite material;
      at least one permeation barrier positioned between the inner region and the outer region and supported by the inner region and the outer region, the at least one permeation barrier configured to substantially inhibit permeation of a fluid to be stored in the composite storage tank, and
      at least one venting layer positioned between the at least one permeation barrier and the outer region, the at least one venting layer comprising a material configured to enable gasses to pass through the at least one venting layer and substantially prevent liquids from passing through the at least one venting layer.

2. The composite storage tank of claim 1, wherein the at least one permeation barrier comprises a layer selected from the group consisting of a metallic foil layer, a continuous metallic layer, a nano-particle based layer, polymer film layer, and multiple thin composite laminate layers.

3. The composite storage tank of claim 1, wherein at least one of the first composite material or the second composite material comprises carbon-fiber.

4. The composite storage tank of claim 1, wherein the inner region comprises one or more layers of the first composite material.

5. The composite storage tank of claim 1, wherein the outer region comprises one or more layers of the second composite material.

6. The composite storage tank of claim 1, wherein the first composite material and the second composite material comprise the same material.

7. The composite storage tank of claim 1, further comprising one or more baffles secured to the inner region.

8. The composite storage tank of claim 1, further comprising one or more stiffeners secured to the inner region.

9. The composite storage tank of claim 1, wherein the at least one permeation barrier comprises at least two permeation barriers and the at least one venting layer is positioned between the at least two permeation barriers.

10. The composite storage tank of claim 1, further comprising a vacuum source operatively coupled to the at least one venting layer configured to evacuate fluid present in the at least one venting layer.

11. The composite storage tank of claim 10, wherein the vacuum source comprises a vacuum generating device.

12. The composite storage tank of claim 10, wherein the vacuum source comprises an environment around the composite storage tank.

13. The composite storage tank of claim 1, further comprising at least two storage volumes inside the composite storage tank separated by a composite separation wall configured to maintain a first fluid in a first storage volume in isolation from at least a second fluid in at least a second storage volume.

14. The composite storage tank of claim 13, wherein the at least two storage volumes are configured as concentric storage tanks and the first storage volume is at least partially surrounded by at least the second storage volume.

15. The composite storage tank of claim 1, wherein the inner region and the outer region are configured to control a thermal expansion of the permeation barrier.

16. A vehicle comprising:
a frame; and
a composite storage tank configured to store at least one fluid, a wall of the composite storage tank comprising:
an inner region comprising a first composite material;
an outer region comprising a second composite material configured in part to secure the composite storage tank to the frame;
at least one permeation barrier positioned between the inner region and the outer region and supported by at least one of the inner region and the outer region;
a stem integrally formed into one or more of the inner region, the outer region, and the permeation barrier, wherein the stem extends to a port and the port provides a fluid pathway for filling and/or usage of the fluid in the vehicle operation; and
a conduit connected to the stem at the port, wherein the conduit configured to transport a fluid between the composite storage tank and another component of the vehicle.

17. The vehicle of claim 16, further comprising a motor, wherein the fluid comprises a fuel and the conduit is configured to transport the fuel from the composite storage tank to the motor.

18. The vehicle of claim 17, wherein the fuel comprises at least one of hydrogen or oxygen.

19. The vehicle of claim 16, further comprising a fitting sealed to the stem configured to provide a sealed connection to the conduit.

20. A method of forming a composite fluid storage tank comprising:
forming an inner composite region by applying at least one ply of a first composite material on a forming surface of a tool configured in a shape of at least part of the composite fluid storage tank;
applying at least one permeation barrier to an outer surface of the inner composite region, the at least one permeation barrier configured to substantially inhibit permeation of a fluid to be stored in the composite storage tank;
applying a venting layer over the least one permeation barrier, the venting layer comprising a material configured to enable gasses to pass through the venting layer and substantially prevent liquids from passing through the venting layer;
forming an outer composite region by applying at least one ply of a second composite material on an outer surface of the venting layer; and
curing the inner composite region and the outer composite region with the at least one permeation barrier to form the composite fluid storage tank.

21. The method of claim 20, wherein applying the at least one permeation barrier comprises applying an adhesive to at least one side of the at least one permeation barrier and attaching the at least one permeation barrier to the outer surface of the inner composite region with the adhesive.

22. The method of claim 20, wherein applying the at least one permeation barrier comprises spraying a permeation barrier material on the outer surface of the inner composite region.

23. The method of claim 20, further comprising forming a stem integrally with the composite fluid storage tank.

24. The method of claim 23, wherein forming the stem comprises:
forming an inner composite layer by applying the first composite material on a forming surface of a tool configured in a shape of at least part of the stem when forming the inner composite region of the composite fluid storage tank;
applying the at least one permeation barrier to an outer surface of the inner composite layer;
forming an outer composite layer by applying the second composite material on an outer surface of the permeation barrier; and
curing the inner composite layer and the outer composite layer with the at least one permeation barrier to form the stem.

25. The method of claim 23, further comprising forming the composite fluid storage tank and stem in an automated process configured to maintain a substantially uniform thickness between the composite fluid storage tank and the stem.

* * * * *

UNITED STATES PATENT AND TRADEMARK OFFICE
CERTIFICATE OF CORRECTION

PATENT NO. : 11,559,964 B2
APPLICATION NO. : 16/894323
DATED : January 24, 2023
INVENTOR(S) : Benson It is certified that error appears in the above-identified patent and that said Letters Patent is hereby corrected as shown below:

In the Claims

| | | | |
|---|---|---|---|
| Claim 4, | Column 21, | Line 47, | change "conduit configured" to --conduit is configured-- |
| Claim 12, | Column 22, | Line 33, | change "the least" to --the at least-- |

Signed and Sealed this
Twenty-third Day of May, 2023

Katherine Kelly Vidal
*Director of the United States Patent and Trademark Office*